(12) United States Patent
Gardner et al.

(10) Patent No.: US 9,384,903 B2
(45) Date of Patent: Jul. 5, 2016

(54) ENERGY STORAGE DEVICE, METHOD OF MANUFACTURING A POROUS STRUCTURE FOR SAME, AND MICROELECTRONIC ASSEMBLY AND SYSTEM CONTAINING SAME

(76) Inventors: Donald S. Gardner, Los Altos, CA (US); Wei Jin, Sunnyvale, CA (US); Zhaohui Chen, San Jose, CA (US)

(*) Notice: Subject to any disclaimer, the term of this patent is extended or adjusted under 35 U.S.C. 154(b) by 206 days.

(21) Appl. No.: 13/977,145

(22) PCT Filed: Dec. 8, 2011

(86) PCT No.: PCT/US2011/064013
§ 371 (c)(1),
(2), (4) Date: Jul. 24, 2014

(87) PCT Pub. No.: WO2013/085526
PCT Pub. Date: Jun. 13, 2013

(65) Prior Publication Data
US 2015/0002986 A1      Jan. 1, 2015

(51) Int. Cl.
*H01G 11/26* (2013.01)
*H01G 11/30* (2013.01)
*H01G 11/10* (2013.01)
*H01G 11/86* (2013.01)

(52) U.S. Cl.
CPC ............... *H01G 11/26* (2013.01); *H01G 11/10* (2013.01); *H01G 11/30* (2013.01); *H01G 11/86* (2013.01); *Y02E 60/13* (2013.01)

(58) Field of Classification Search
None
See application file for complete search history.

(56) References Cited

U.S. PATENT DOCUMENTS

| 5,635,419 | A | 6/1997 | Geiss et al. | |
|---|---|---|---|---|
| 6,226,173 | B1 * | 5/2001 | Welsch | H01G 9/048 361/508 |
| 9,206,523 | B2 * | 12/2015 | Gardner | C25F 3/12 |
| 2004/0090735 | A1 * | 5/2004 | Kimura | H01G 9/012 361/502 |
| 2007/0002525 | A1 | 1/2007 | Yamanoi et al. | |
| 2007/0177332 | A1 * | 8/2007 | Kobayashi | H01G 11/38 361/305 |
| 2007/0235342 | A1 * | 10/2007 | Matsuo | B82Y 20/00 205/175 |
| 2011/0149476 | A1 | 6/2011 | Saida et al. | |

FOREIGN PATENT DOCUMENTS

| EP | 1643546 A2 | 4/2006 |
|---|---|---|
| JP | 10-321481 A | 12/1998 |
| JP | 2005002371 A | 1/2005 |

(Continued)

OTHER PUBLICATIONS

European Search Report Received for EP Patent Application No. 11876973.6, Mailed on Oct. 1, 2015, 7 pages.
Office Action received for Taiwan Patent Application No. 101144780, mailed on Apr. 18, 2014, 11 Pages of English Translation and 15 Pages of Office Action.

(Continued)

*Primary Examiner* — Dion R Ferguson
(74) *Attorney, Agent, or Firm* — Kenneth A. Nelson

(57) ABSTRACT

An energy storage device comprises at least one porous structure (500, 900) containing multiple channels (510), each one of which has an opening to a surface (505) of the porous structure. Each one of the channels has a first end (511) having a first average width (513) and a second end (512) having a second average width (514), with the first end being located where the channel opens to the surface of the porous structure and the second end being located at a distance from the first end as measured along a length of the channel. For at least some of the channels, the first average width is larger than the second average width.

20 Claims, 10 Drawing Sheets

(56) References Cited

FOREIGN PATENT DOCUMENTS

| | | |
|---|---|---|
| JP | 2005317706 A | 11/2005 |
| WO | 2011015842 A1 | 2/2011 |
| WO | 2011123135 A1 | 10/2011 |
| WO | 2013/085526 A1 | 6/2013 |

OTHER PUBLICATIONS

International Preliminary Report on Patentability received for International Application No. PCT/US2011/064013, mailed on Jun. 19, 2014, 6 pages.
International Search Report and Written Opinion received for International Application No. PCT/US2011/064013, mailed on Aug. 28, 2012, 9 pages.

* cited by examiner

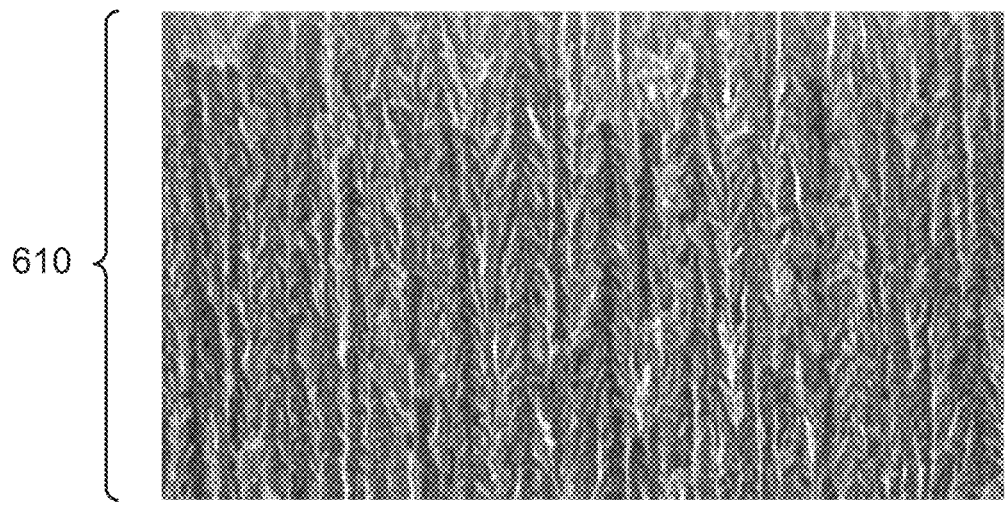
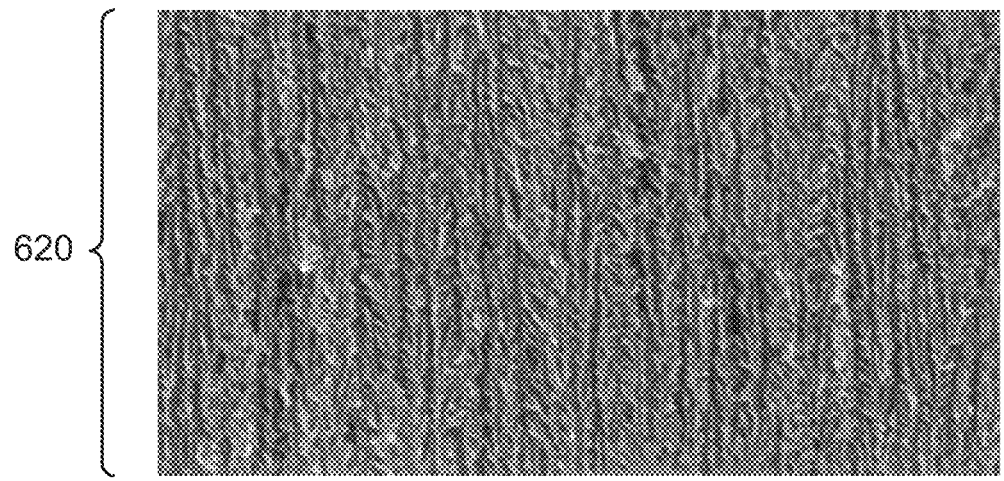
FIG. 6

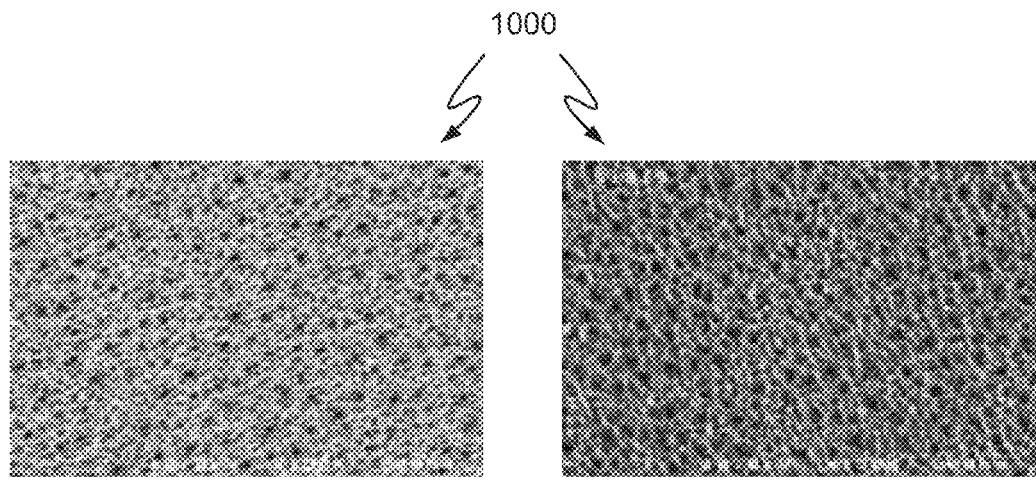
*FIG. 10a*     *FIG. 10b*
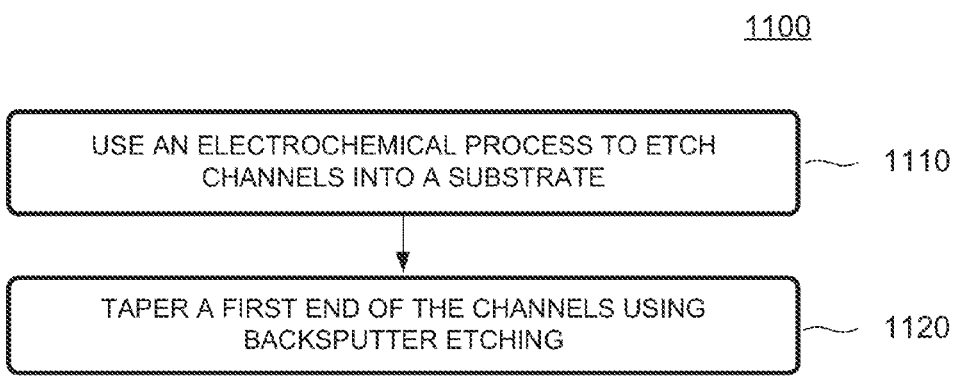
*FIG. 11*

ENERGY STORAGE DEVICE, METHOD OF MANUFACTURING A POROUS STRUCTURE FOR SAME, AND MICROELECTRONIC ASSEMBLY AND SYSTEM CONTAINING SAME

CROSS REFERENCE TO RELATED APPLICATION

This application is related to International Application No. PCT/US2010/029821, filed on Apr. 2, 2010 and assigned to the same assignee to which the present application is assigned.

FIELD OF THE INVENTION

The disclosed embodiments of the invention relate generally to energy storage devices, and relate more particularly to performance enhancement for energy storage devices.

BACKGROUND OF THE INVENTION

Modern societies depend on the ready availability of energy. As the demand for energy increases, devices capable of efficiently storing energy become increasingly important. As a result, energy storage devices, including batteries, capacitors, electrochemical capacitors (ECs), (including pseudocapacitors and electric double-layer capacitors (EDLCs)—also known as ultracapacitors, among other names), hybrid ECs, and the like are being extensively used in the electronics realm and beyond. In particular, capacitors are widely used for applications ranging from electrical circuitry and power delivery to voltage regulation and battery replacement. Electrochemical capacitors are characterized by high energy storage capacity as well as other desirable characteristics including high power density, small size, and low weight, and have thus become promising candidates for use in several energy storage applications.

The related case mentioned above (International Application No. PCT/US2010/029821) discloses three-dimensional structures for forming high energy density electrochemical capacitors using, for example, porous silicon. In some of the disclosed embodiments, an electrochemical process was used to etch pores deep into a silicon structure and the pores were filled with an electrolyte or with a high-k dielectric material and/or a thin conductive film in combination with an electrolyte.

BRIEF DESCRIPTION OF THE DRAWINGS

The disclosed embodiments will be better understood from a reading of the following detailed description, taken in conjunction with the accompanying figures in the drawings in which:

FIG. 6 is an image of a cross-sectional slice of a porous silicon structure having tapered pores therein according to an embodiment of the invention;

FIGS. 10a and 10b are images of the surface of a porous silicon substrate before (FIG. 10a) and after (FIG. 10b) the performance of the method of FIG. 8;

FIG. 11 is a flowchart illustrating a method of manufacturing a porous structure for an energy storage device according to another embodiment of the invention;

Figure 1:
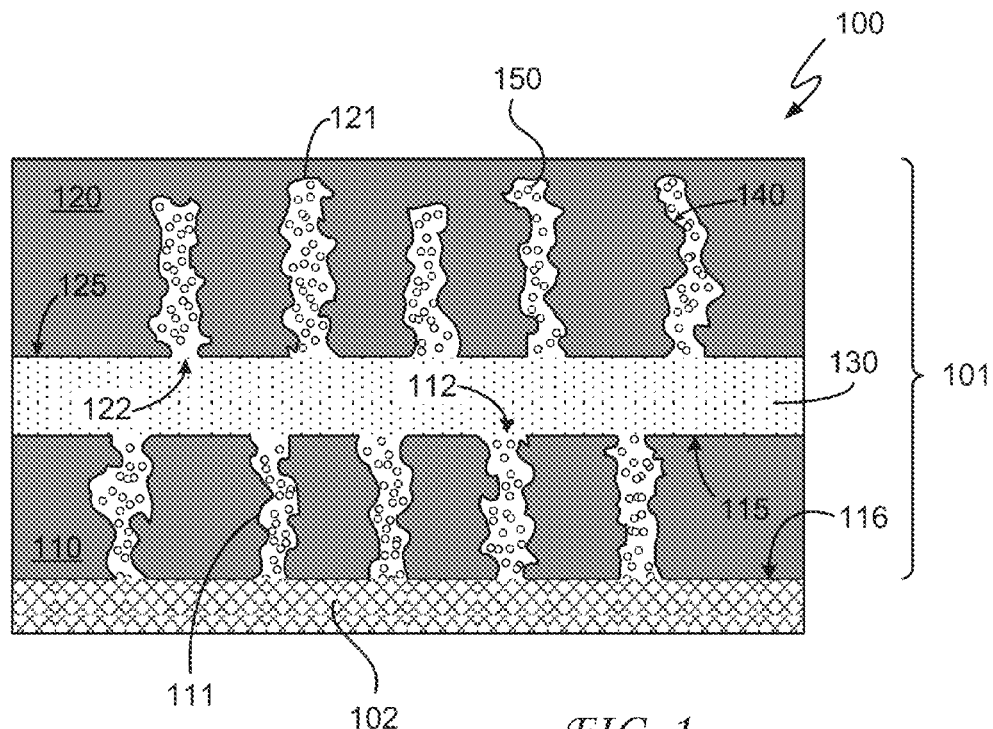
FIGS. 1 and 2 are cross-sectional views of an energy storage device according to embodiments of the invention.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions unless otherwise indicated either specifically or by context. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

DETAILED DESCRIPTION OF THE DRAWINGS

In one embodiment of the invention, an energy storage device comprises at least one porous structure containing multiple channels, each one of which has an opening to a surface of the porous structure. Each one of the channels has a first end having a first average width and a second end having a second average width, with the first end being located where the channel opens to the surface of the porous structure and the second end being located at a distance from the first end as measured along a length of the channel. For at least some of the channels, the first average width is larger than the second average width such that the channels have a tapered or conical structure.

The above-described channel structure according to embodiments of the invention minimizes the effective series resistance (ESR) of the energy storage device, at least in part because the relatively larger channel openings allow the electrolyte to move in and out of the channels more easily. In at least some embodiments, the material from which the porous structure is made (e.g., silicon) can be doped to still further reduce its resistivity. The channel structure also leads, indirectly, to an increase in achievable capacitance. This effect comes about because larger openings facilitate the deposition of atomically thin films such as electrical conductors and high-k dielectrics, which, in addition to further reducing resistance, can lead to increased capacitance.

Although much of the discussion herein will focus on electrochemical capacitors, the "energy storage device" designation explicitly includes, in addition to ECs, hybrid electrochemical capacitors, which, like electrochemical capacitors, are discussed in more detail below, as well as batteries, fuel cells, and similar devices that store energy. Energy storage devices according to embodiments of the invention can be used for a wide variety of applications, including in personal computers (PCs), including desktop and laptop (notebook) computers, tablet computers, cell phones, smart phones, music players, servers, other electronic devices, automobiles, buses, trains, airplanes, other transportation vehicles, home energy storage, storage for energy generated by solar or wind energy generators, especially energy harvesting devices, and many others.

Electrochemical capacitors operate according to principles similar to those that govern conventional parallel plate capacitors, but certain important differences do apply. One significant difference concerns the charge separation mechanism. For one important class of ECs this typically takes the form of a so-called electric double layer, or EDL, rather than of the dielectric of a conventional capacitor. The EDL is created by the electrochemical behavior of ions at an interface between a high-surface area electrode and an electrolyte, and results in an effective separation of charge in spite of the fact that the layers are so close together. (Physical separation distances are on the order of a single nanometer.) Thus, a typical EDL capacitor may be thought of as storing charge in its EDL. Each layer of the EDL is electrically conductive but the properties of the double layer prevent current from flowing across the boundary between them. (The EDL is further discussed below in connection with FIG. 3.)

As is true in conventional capacitors, capacitance in an EDL capacitor is proportional to the surface area of the electrodes and inversely proportional to the charge separation distance. The very high capacitances achievable in an EDL capacitor are due in part to the very high surface area attributable to the multi-channel porous structure and to the nanometer-scale charge separation distance attributable to the EDL, which arises due to the presence of an electrolyte, as explained above. One type of electrolyte that may be used in accordance with embodiments of the invention is an ionic liquid. Another is an electrolyte (e.g., $Li_2SO_4$, $LiPF_6$) comprising an ion-containing solvent. Organic electrolytes and solid-state electrolytes are also possible. Another class of electrochemical capacitor is the pseudocapacitor, where instead of EDL capacitance a different kind of capacitance one that is faradaic and not electrostatic in origin can arise at certain types of electrodes. This different kind of capacitance is called "pseudocapacitance." Pseudocapacitors are energy storage devices that behave like capacitors but also exhibit reactions that result in charge storage. Typically, one of the electrodes of a pseudocapacitor is coated with a transition metal oxide such as $MnO_2$, $RuO_2$, $NiO_x$, $Nb_2O_5$, etc., or with over materials including $Mo_2N$, VN, $W_2N$, $W_2C$ (tungsten carbide), $Mo_2C$, VC, a suitable conducting polymer, or a similar material. These materials can be used with an electrolyte such as potassium hydroxide (KOH); when the device is charged, the electrolyte will react with the material in a reaction that allows energy to be stored in a manner that has similarities to a battery's energy storage. More specifically, these materials store energy through highly-reversible surface and subsurface redox (faradic) reactions, but at the same time the electric double layer energy storage mechanism remains in place and provides the potential for high power.

Hybrid electrochemical capacitors are energy storage devices that combine the attributes of ECs and batteries. In one example, an electrode coated with a lithium ion material is combined with an electrochemical capacitor in order to create a device that has an EC's rapid charge and discharge characteristics and a battery's high energy density. On the other hand, hybrid ECs, like batteries, have shorter expected lifespans than do electrochemical capacitors.

Figure 2:
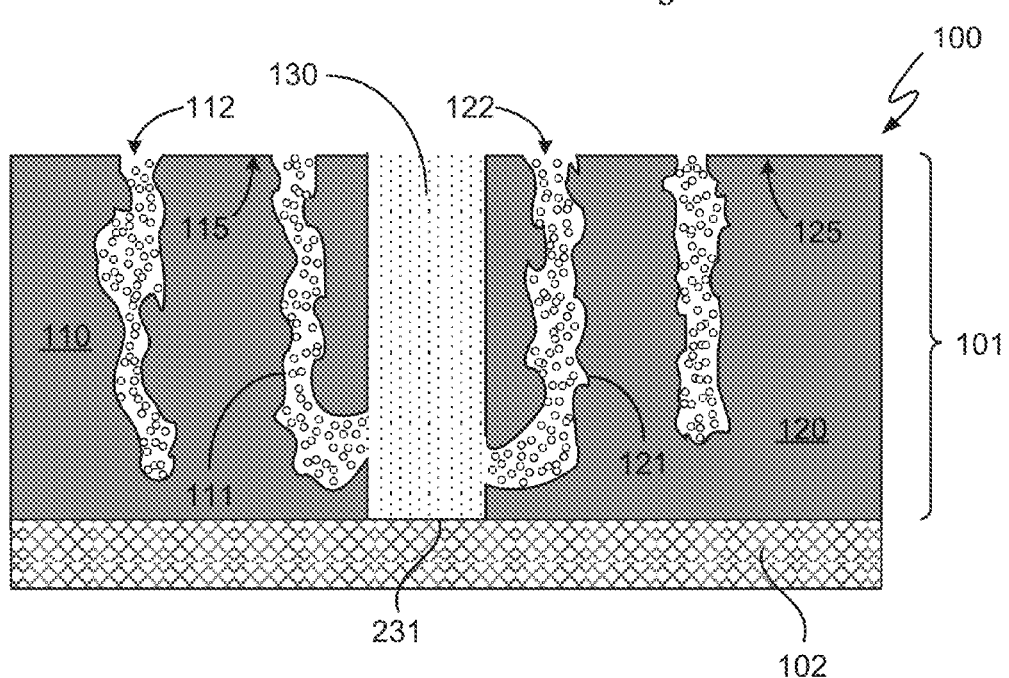

Referring now to the drawings, FIGS. 1 and 2 are cross-sectional views of an energy storage structure 100 according to embodiments of the invention. As illustrated in FIGS. 1 and 2, energy storage structure 100 comprises an energy storage device 101 and a support structure 102. Energy storage device 101 comprises an electrically conductive structure 110 and an electrically conductive structure 120 separated from each other by a separator 130 that is an electrical insulator and an ionic conductor. Separator 130 prevents electrically conductive structures 110 and 120 from physically contacting each other so as to prevent an electrical short circuit. (In other embodiments, for reasons discussed below, a separator is not necessary and can be omitted.)

At least one of electrically conductive structures 110 and 120 comprises a porous structure containing multiple channels, each one of which has an opening to a surface of the porous structure. This feature is a result of the process, described below, used to form the porous structure. As an example, the porous structure may be formed within a conductive or a semiconductive material. Alternatively, the porous structure may be formed within an insulating material (e.g., alumina) that has been coated with an electrically conductive film (e.g., an atomic layer deposition (ALD) conductive film such as titanium nitride (TiN)). In this regard, materials having greater electrical conductivity are advantageous because they lower the ESR. In the illustrated embodiments, both electrically conductive structure 110 and electrically conductive structure 120 comprise such a porous structure. Accordingly, electrically conductive structure 110 comprises channels 1.11 with openings 112 to a surface 115 of the corresponding porous structure and electrically conductive structure 120 comprises channels 121 with openings 122 to a surface 125 of the corresponding porous structure.

Various configurations of energy storage device 101 are possible. In the embodiment of FIG. 1, for example, energy storage device 101 comprises two distinct porous structures (that is, electrically conductive structure 110 and electrically conductive structure 120) that have been bonded together face-to-face with separator 130 in between. As another example, in the embodiment of FIG. 2 energy storage device 101 comprises a single planar porous structure in which a first section (electrically conductive structure 110) is separated from a second section (electrically conductive structure 120) by a trench 231 containing separator 130. One of the electrically conductive structures will be the positive side and the other electrically conductive structure will be the negative side. As an example, separator 130 could be a permeable membrane or other porous polymer separator. In general, the separator prevents the physical contact of anode and cathode (which could cause an electrical malfunction in the device) while permitting the transfer of ionic charge carriers. In addition to polymer separators, several other separator types are possible. These include nonwoven fiber sheets, liquid membranes, polymer electrolytes, solid ion conductors, and the like.

It should be noted that the separator, although shown in FIG. 2, may not be necessary in the configuration illustrated there because, for example, support structure 102 could be used to maintain a physical separation between structures 110 and 120. As another example, electrically conductive structures 110 and 120 could each be attached to a ceramic package (not shown) that would keep the two electrically conductive structures physically separate from each other.

As an example, the porous structure of electrically conductive structures 110 and 120 can be created by a wet etch process in which a liquid etchant applied to a surface of the electrically conductive structures etches away portions of the electrically conductive structure in a way that is at least somewhat similar to the way water is able to carve channels in rock. This is why each one of the channels has an opening to the surface of the electrically conductive structure; the wet etch method is incapable of creating fully-enclosed cavities, i.e., cavities with no opening to the surface, like an air bubble trapped inside a rock, within the porous structure. This is not to say that those openings cannot be covered with other materials or otherwise closed up because of the presence of or addition of other materials—that is in fact likely to occur in several embodiments—but, whether covered or not, the described openings to the surface are a feature of each channel in each porous structure according to at least one embodiment of the invention. (One embodiment in which the openings may be covered up is one in which a layer of epitaxial silicon as a location for circuitry or other wiring is grown on top of the channels).

With the right etchant, it should be possible to make porous structures having the described characteristics from a wide variety of materials. Silicon in various forms—including metallurgical grade silicon, monocrystalline silicon, polycrystalline silicon, and silicon on insulator—is one material that works well. As an example, a porous silicon structure may be created by etching a silicon substrate with a mixture of hydrofluoric acid and ethanol. More generally, porous silicon and other porous structures may be formed by such processes as anodization and stain etching. Etching techniques according to embodiments of the invention will be discussed in more detail below.

Besides porous silicon, which has already been mentioned, some other materials that may be especially well-suited for energy storage devices according to embodiments of the invention are porous germanium and porous tin. Possible advantages of using porous silicon include its compatibility with existing silicon technology. Porous germanium enjoys a similar advantage as a result of existing technology for that material and, as compared to silicon, enjoys the further possible advantage that its native oxide (germanium oxide) is water-soluble and so is easily removed. (The native oxide that forms on the surface of silicon may trap charge, which is an undesirable result.) Porous germanium is also highly compatible with silicon technology. Possible advantages of using porous tin, which is a zero-band-gap material, include its enhanced conductivity with respect to certain other conductive and semiconductive materials. Other materials may also be used for the porous structure, including gallium arsenide (GaAs), indium phosphide (InP), boron nitride (BN), silicon carbide (SiC), alloys such as an alloy of silicon and germanium, and metals such as copper, aluminum, nickel, calcium, tungsten, molybdenum, and manganese.

Referring again to FIGS. 1 and 2, energy storage structure 100 further comprises (in the embodiment illustrated in FIG. 1) an electrically conductive coating 140 on at least a portion of the porous structure and in at least some of channels 111 and/or channels 121. Such an electrically conductive coating may be necessary in order to maintain or enhance the conductivity of the porous structure, or it may be helpful in reducing ESR, thereby improving performance. For example, a device having lower ESR is able to deliver higher power (which may be manifested in terms of greater acceleration, more horse power, etc.). In contrast, higher ESR (a condition that prevails inside a typical battery) limits the amount of available energy, at least partially due to the fact that much of the energy is wasted as heat, Illustrated in FIGS. 1 and 2 is an electrolyte 150, which gives rise to the EDL, as explained above. Electrolyte 150 (as well as the other electrolytes described herein) is represented in the drawings using a random arrangement of circles. This representation is intended to convey the idea that the electrolyte is a substance (liquid or solid, including gel-like materials) containing free ions. The circles were chosen for convenience and are not intended to imply any limitation as to the electrolyte components or qualities, including any limitation with respect to the size, shape, or number of the ions.

Figure 3:
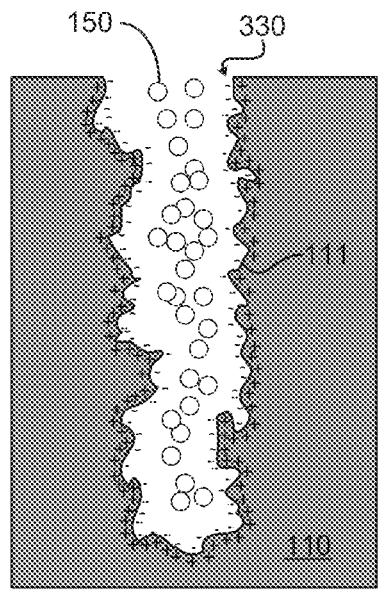
FIG. 3 is a depiction of an electric double layer formed within a channel of a porous structure according to an embodiment of the invention.

After the introduction of electrolyte 150, an electric double layer is formed within the channels of the porous structure, as depicted schematically in FIG. 3. In that figure, an electrical double layer 330 has been formed within one of channels 111. EDL 330 is made up of two layers of ions, one of which is the electrical charge of the sidewalls of channel 111 (depicted as being positive in FIG. 3 but which in other embodiments could be negative) and the other of which is formed by free ions in the electrolyte. EDL 330 thus provides a separation of charge that is necessary in order for the capacitor to function. As explained earlier, the large capacitance, and, hence, energy storage potential, of EDL capacitors arises in part due to the small (approximately 1 nanometer (nm)) separation distance between electrolyte ions and the electrode surface charge.

It should be noted that the FIG. 1 and FIG. 2 depictions of the porous structures are highly idealized in that, to mention just one example, all of channels 111 and 121 are shown as only extending vertically. In reality the channels would branch off in multiple directions to create a tangled, disorderly pattern that may look something like the porous structure shown in FIG. 4.

Figures 4A, 4B:
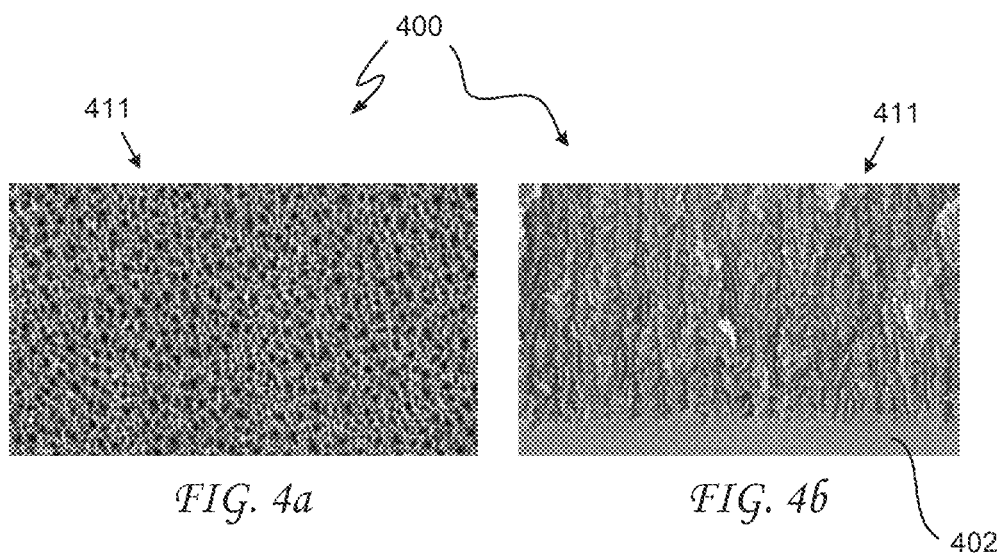
FIGS. 4a and 4b are images of, respectively, a surface and a cross-sectional slice of a porous silicon structure.

FIGS. 4a and 4b are scanning electron microscope (SEM) images of, respectively, a surface and a cross-sectional slice of a porous structure 400 (in this case porous silicon). As illustrated, porous structure 400 contains multiple channels 411. It should be understood that channels 411 are likely to twist and turn along their lengths such that a single channel may have both vertical and horizontal portions as well as portions that are neither completely vertical nor completely horizontal but fall somewhere in between. Note that in FIG. 4b, the channels extend near to but do not quite reach a bottom of the etched structure, thus leaving a layer 402 of un-etched silicon underneath the channels. In one embodiment, un-etched layer 402 acts as a support structure for porous structure 400 (and for the corresponding energy storage device, not shown), and is thus the equivalent of support structure 102.

Figure 5A:
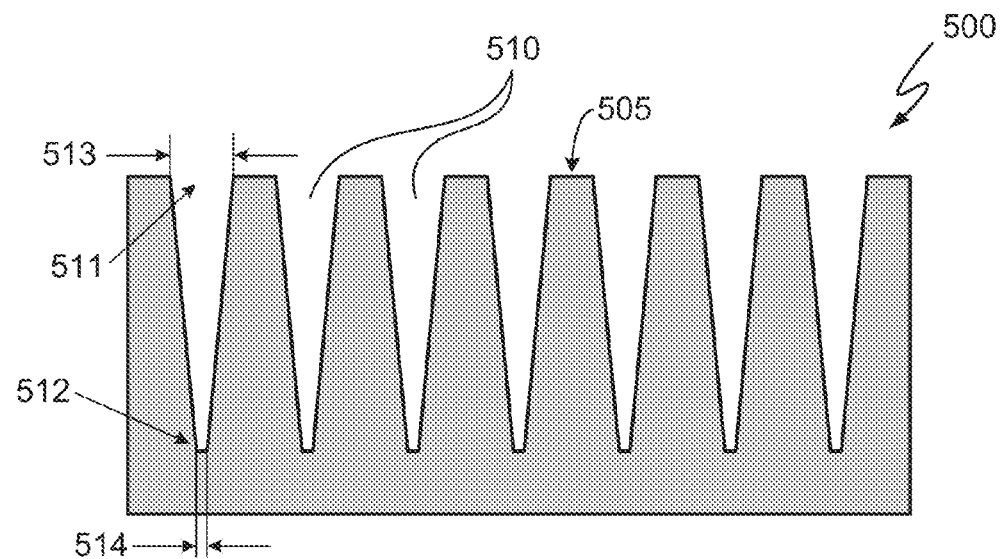
FIGS. 5a-5d are cross-sectional views of a porous structure that may form part of an energy storage device according to embodiments of the invention.

FIGS. 5a-5d are cross-sectional views of a porous structure 500 that may form part of an energy storage device according to embodiments of the invention. Referring to FIG. 5a, porous structure 500 comprises multiple channels 510, each one of which opens to a surface 505 of porous structure 500. Each channel 510 has an end 511 located at surface 505 and an opposing end 512 located at a distance from end 511 as measured along a length of the channel. In the depiction of FIG. 5a it is convenient to think of end 511 as the top of channel 510 and of end 512 as the bottom. It should be understood, however, that the channel depiction in FIG. 5a (as well as in FIGS. 5b-5d) is highly simplified; a more realistic depiction would match more closely with the SEM image of FIG. 4b, where channel tops and (especially) bottoms are at least somewhat less well-defined. It was for this reason that the earlier description of the physical relationship between ends 511 and 512 was left slightly open-ended, and it should be understood that a section of the channel located at a greatest depth within porous structure 500 may be different from a section of the channel located at a greatest distance from end 511 as measured along a length of the channel. Either of these sections—or some other section—may be designated as end 512 of channel 510 in various embodiments of the invention.

End 511 of channel 510 has an average width 513, while end 512 has an average width 514. In one embodiment, for at least some of the channels (and, in practice, for most or all of the channels), average width 513 is larger than average width 514 such that channels 510 have a tapered or conical shape that has a relatively wide opening at surface 505 and then narrows as it extends farther into porous structure 500. It should be noted that the values of average widths 513 and 514 can vary from one channel 510 to another.

Among other potential advantages, the relatively large opening of channel 510 at end 511 reduces the ESR of an energy storage device of which porous structure 500 is a component and also enables and facilitates processes (e.g., ALD) that can increase the achievable capacitance. The ESR reduction is achieved because larger openings provide more space and therefore produce less resistance to substances—including ions in the electrolyte—as they are deposited into or move in and out of the channels. This is advantageous during at least two stages of the energy storage device's lifetime: (1) during manufacture, both when an electrolyte is first placed as deeply as possible into channels 510, and when various dielectric and electrically conductive materials (as well as other possible substances) are deposited by ALD, electroplating, or other processes into the channels; and (2) during operation, when optimal performance depends in part upon the ability of ions within the electrolyte to easily move in and out of the channels. All of these processes and actions, at both of these stages, are facilitated by the tapered structure with its larger channel openings. Moreover, the larger openings make it easier to remove any residual etching solution (e.g., hydrofluoric acid) that is used to create the channels. The etching solution must be removed in order to avoid channel cracking and other problems that would otherwise occur. Earlier resolutions for these problems, performed without the benefit of embodiments of the present invention, involved introducing high-volatility pentene or the like into the etch solution in order to cause the solution to dry with minimal surface tension so that cracking may be kept under control during the evaporation of the solution.

The increased capacitance arising out of the tapered structure of the channels is due, at least in part, to the increased surface area attainable by virtue of the existence of higher numbers of smaller channels. Capacitance is directly proportional to surface area; increasing the number of channels leads to an increase in surface area; and the smaller the channels the more of them can fit into a given space. This is why embodiments of the invention feature tapered channels rather than channels that maintain the size of the relatively large openings (which as discussed above are advantageous at and near the surface of the porous structure) along the entire channel length.

Figure 5B:
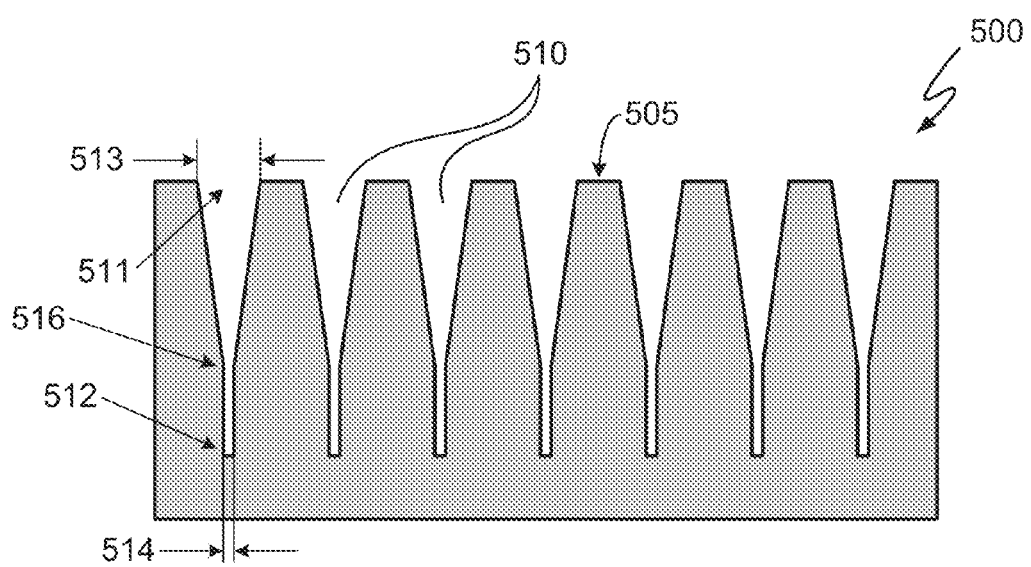
Figure 5C:
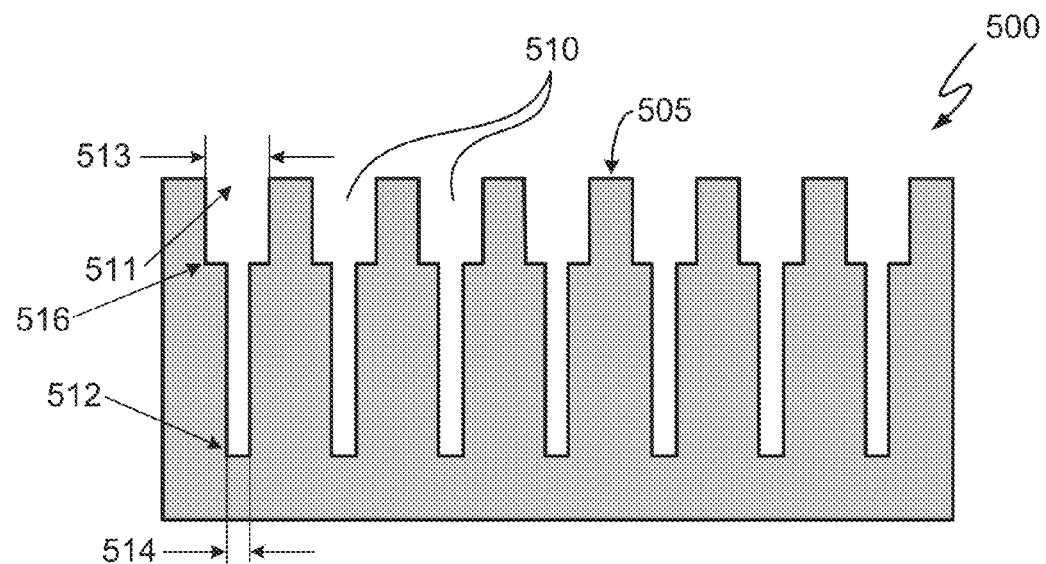

It should be noted in connection with this discussion of channel sizes that there is an optimal minimum width below which it would likely be disadvantageous to go. This optimal minimum may be determined by matching as closely as possible the width of the channels to the size of the molecules in the electrolyte; doing this yields a large increase in achievable capacitance. Embodiments of the invention therefore include porous structures having channels that are large enough to be completely accessed by the electrolyte but small enough—above that lower limit—to result in a surface area that is as large as possible. This yields a porous structure having a relatively higher porosity near its top—leading to all of the advantages disclosed herein—and a relatively lower porosity near its bottom providing enhanced mechanical strength to the overall structure. Accordingly, some embodiments of the invention feature channels that taper from a relatively large opening down to a minimum average width and then maintain that average width (i.e., undergo no further tapering) for the remaining distance to the other end of the channel. An example of this configuration is shown in FIG. 5b, where channel 510 tapers from average width 513 at end 511 to average width 514 at an intermediate point 516 that is located between ends 511 and 512 and then maintains that average width (514) between intermediate point 516 and end 512. Note that the location of intermediate point 516 is constrained only in that it must lie somewhere between ends 511 and 512 along the length of channel 510; its precise location along that path may vary from one embodiment to another. Intermediate point 516 may act as a dividing line between an upper section and a lower section of channel 51.0.

In one embodiment, the optimal minimum average channel width (corresponding to width 514 for porous structure 500) is between approximately five nm and 20 nm. Channel widths less than the lower end of that optimal range, while still quite a bit larger than the size of the ions in the electrolyte, are approaching a size at which ion movement may begin to be inhibited, which would be an undesirable result. Capacitance is proportional to surface area, as mentioned above, but only that surface area that is accessible to the electrolyte contributes to capacitance. In embodiments where there is to be an ALD film or other coating in the channel, the space taken up by that film or coating needs to be taken into account when determining minimum average channel widths.

Referring again to FIG. 4b, it may be seen that the channels have a branching structure having a main channel with smaller channels branching off. The sidewalls of all of these channels may contain small divots, pits, indentations, depressions, or dimples—features that are too small to be seen in the figure—that advantageously contribute to the porous structure's overall surface area. These divots have an average size—perhaps 0.25 nm—that is well below the low end of the optimal channel width range. In some embodiments the divot size may be adjusted so as to closely correspond to the size of the electrolyte's ions—to within at least half a nanometer, for example—and doing this yields a capacitance boost even beyond what would be expected from the surface area contribution.

Just as there is an optimal minimum average channel width, there is also an optimal maximum average channel width—that is, an optimal average width of the channel at end 511. Channel widths greater than that optimal maximum result in a loss of potential surface area and thus a reduction in potential capacitance. In one embodiment, the optimal maximum average channel width (corresponding to width 513 for porous structure 500) is between approximately 25 nm and 250 nm, with sizes between approximately 50 nm and 100 nm being preferred. For example, in one embodiment an optimal channel would taper from an initial average width of roughly 50 nm down to a minimum average width of roughly 20 nm, with the minimum average width being attained either at the bottom of the channel or at some point in between the channel's ends. (These values are particularly applicable to electrochemical capacitor embodiments; other embodiments may require different values, such as, perhaps, a channel tapering from an initial average width of 500 nm down to an average width of 100 nm for a battery application.) Such a channel would act like a funnel—easily funneling ions in and out of the opening and directing them down to the deeper portions of the channel.

In certain embodiments, as suggested above, at least some of the channels comprise an upper section, extending from a first end of the channel to an intermediate point between the first end and a second end of the channel, and a lower section extending from the intermediate point to the second end. Some of these embodiments have the structure of FIG. 5b. Others of these embodiments have the structure shown in FIG. 5c—where all of the upper section has average width 513 and an of the lower section has average width 514—or the structure shown in FIG. 5d—where upper and lower sections have no taper and are separated by an intermediate section having tapered sidewalls. Other (non-illustrated) channel structures are also possible.

Figure 5D:
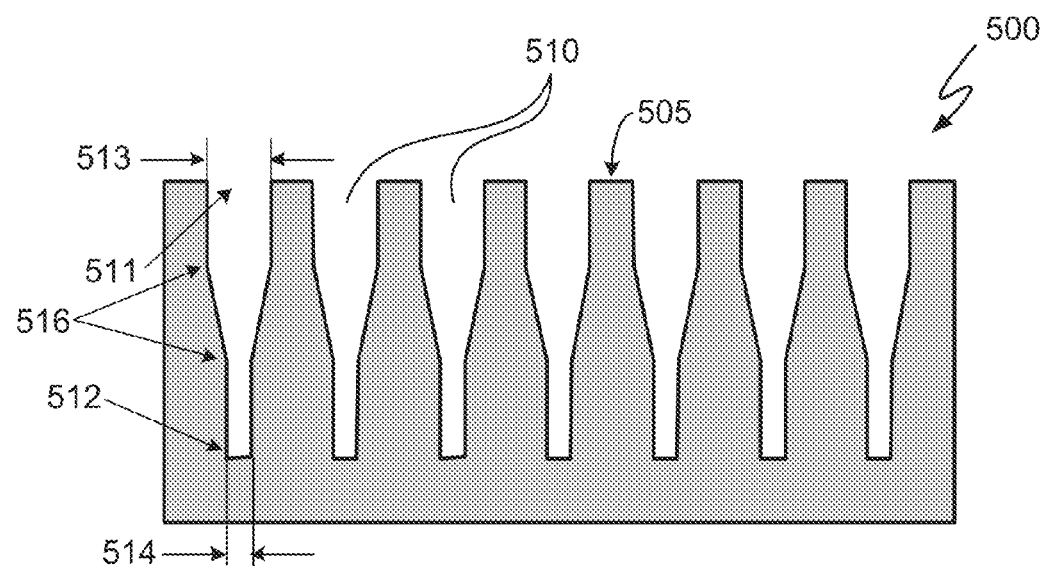

Note that in FIG. 5d there are two intermediate points 516 marking boundaries between tapered and straight sections. Of course, it should be understood that as used in this context the qualifier "straight" is a relative term, and it is reiterated here that the actual channels are much more similar to the actual images of FIG. 4b—with their twisting and branching sidewalls—than to the highly simplified depictions of FIGS. 5a-5d. An even more relevant comparison may be to FIG. 6, which is a SEM image of a cross-sectional slice of a porous silicon structure 600 having tapered pores therein according to an embodiment of the invention. The figure contains an image of an upper section 610 and a lower section 620 of the porous silicon structure. The two sections are part of the same sample and are shown at the same scale. Larger current densities produce larger channels. This may be seen in the figure by comparing the channels in upper section 610 with those in lower section 620; the upper channel widths are noticeably larger than the lower channel widths.

Porous silicon structure 600 was prepared by applying an electrochemical etch technique to a solid silicon wafer having an initial resistivity of 0.7 mΩ-cm. A mixture of hydrofluoric acid and isopropyl alcohol was used as the etchant. (In some embodiments ethanol alcohol may be substituted for isopropyl alcohol.) The current density varied between an initial value of 200 milliamps per square centimeter ($mA/cm^2$) and a final value of 25 $mA/cm^2$. (The area component in these values refers to an area of the silicon surface.)

The foregoing discussion has made reference to porous structures having various configurations according to embodiments of the invention. These porous structures, as mentioned above, can be formed within a variety of materials, including silicon (in various forms, including metallurgical grade silicon, monocrystalline silicon, polycrystalline silicon, and silicon on insulator), germanium, GaAs, InP, BN, tin, copper, aluminum, nickel, calcium, tungsten, molybdenum, manganese, silicon carbide, and silicon-germanium alloys. As has also been mentioned, the material from which the porous structure is made can, in at least some embodiments, be doped with elements that increase its conductivity; this may be done using standard techniques that are known in the art. In one embodiment, the material in which the porous structure is formed is silicon and the dopant species is boron, which may be introduced into the silicon in a concentration of, for example, $10^{19}$ atoms/$cm^3$. Other possible dopants include phosphorus and arsenic (though these and other n-type dopants require an illumination process during etching that p-type dopants do not).

Embodiments of the invention that rely on electrochemical etching as the channel creation technique have another reason for introducing dopants into the material from Which the porous structure is to be made. Where silicon and an HF etchant are used, it is thought that a high electric field attracts holes at defects and at the tip of the pores that aid the reaction between the silicon and the fluorine from the etchant. It is thought that the process involves the formation of $SiF_4$ molecules in liquid form. The $SiF_4$ gets pulled away and eventually gets washed out of the channels, leaving hydrogen atoms that bond to the sidewalls and also form $H_2$ that then bubbles away as a gas. Some hydrogen atoms remain; these bond with remaining silicon atoms. This process etches the channel (anisotropically) downward as opposed to expanding laterally in an isotropic manner (which would simply polish the surface without forming channels). Additional details, as best understood, are set forth below (though it must be said that precise details of the mechanism of porous silicon formation remain at least somewhat unclear).

In general terms, during channel formation, direct dissolution of the semiconductor almost always competes with oxidation plus subsequent dissolution of the oxide. The etchant (e.g., HF), therefore, has to be able to dissolve the oxide. A second prerequisite for the dissolution reaction and thereby channel formation in a semiconductor is the availability of electronic holes. The silicon surface, in contact with aqueous HF solutions, becomes saturated by hydrogen and tends to be chemically inactive with respect to the electrolyte (this protects the channel sidewalls during the etching process). If a voltage is applied to the electrodes, the holes present in a silicon wafer start migrating towards the silicon-electrolyte interface. At the interface, a hole removes one silicon bond and thereby makes one silicon atom more susceptible for interactions with the electrolyte. Eventually, the silicon atom is transferred into the solution. The electrode decomposes into areas with optimal current density and channels are formed in areas with almost no current density. According to different models, initiation of the channel growth could begin at micro-cavities, structural defects, mechanically strained areas, or local perturbation of the surface potential field.

It is known in the art that achievable channel widths fall into a range that depends upon the current densities used to create the channels and the resistivity of the material in which the channels are formed. For a p-type dopant species in silicon, it has been observed that approximately 5 mΩ-cm is a maximum silicon resistivity that would result in tapered channels of the sizes targeted by embodiments of the invention. For an n-type dopant species in silicon, the corresponding maximum silicon resistivity is approximately 25 mΩ-cm.

The foregoing discussion addresses the idea that etching high aspect ratio channels—including tapered channels—may be easier, or may only be possible, in semiconductive materials. However, once the channels are formed it is desirable to impart as much electrical conductivity as possible to the resulting porous structure and associated energy storage device. This may be accomplished by introducing an element into the silicon (or other semiconducting material) that is a deep layer trap causing the silicon or other semiconducting material to lose its semiconducting properties. As an example, the element may be introduced into the semiconducting material by furnace diffusion. Copper, iron, and the like are examples of elements that may be suitable for this purpose (because they extend into the band gap and alter the material's semiconducting properties for conductive ones).

Figure 7:
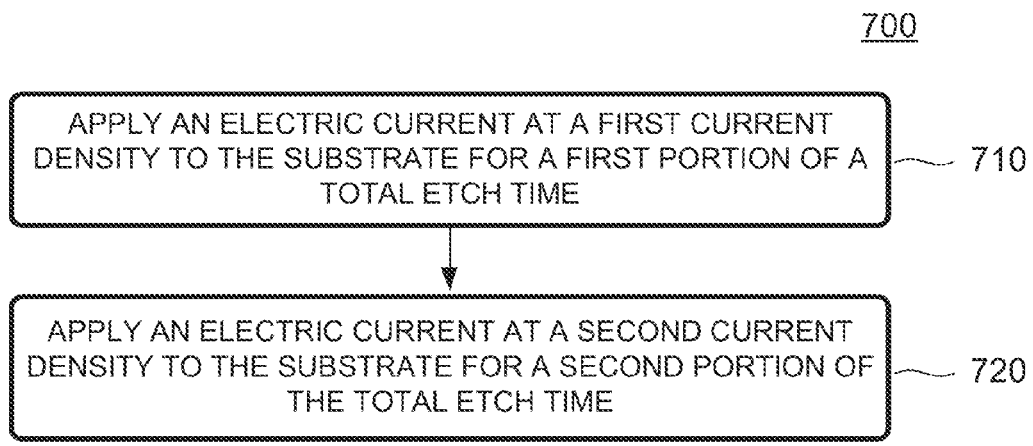
FIG. 7 is a flowchart illustrating a method of manufacturing a porous structure for an energy storage device according to an embodiment of the invention.

FIG. 7 is a flowchart illustrating a method 700 of manufacturing a porous structure for an energy storage device according to an embodiment of the invention. As an example, method 700 may result in the formation of a porous structure similar to any of the porous structures depicted in FIGS. 5a-5d and FIG. 6. Method 700 makes use of an electrochemical each process to etch channels into a substrate. The etch process lasts for a period of time referred to as a "total etch time."

A step 710 of method 700 is to apply an electric current at a first current density to the substrate for a first portion of a total etch time. As alluded to above, the current density is measured (typically) in mA/cm², with the area component referring to an area of the substrate surface.

A step 720 of method 700 is to apply an electric current at a second current density to the substrate for a second portion of the total etch time.

In one embodiment, the first portion of the total etch time and the second portion of the total etch time, taken together, are equivalent to the total etch time, meaning that only two current densities are used during the etch. As an example, this may yield a stepped profile such as that shown in FIG. 5c.

In another embodiment, the first portion of the total etch time and the second portion of the total etch time, taken together, represent less than the total etch time such that the electrochemical etch process includes additional time periods representing additional portions of the total etch time. In this embodiment, the method may involve selecting a current density for each of the additional time periods so as to cause the channels to be tapered, that is, to have a roughly conical shape.

Figure 8:
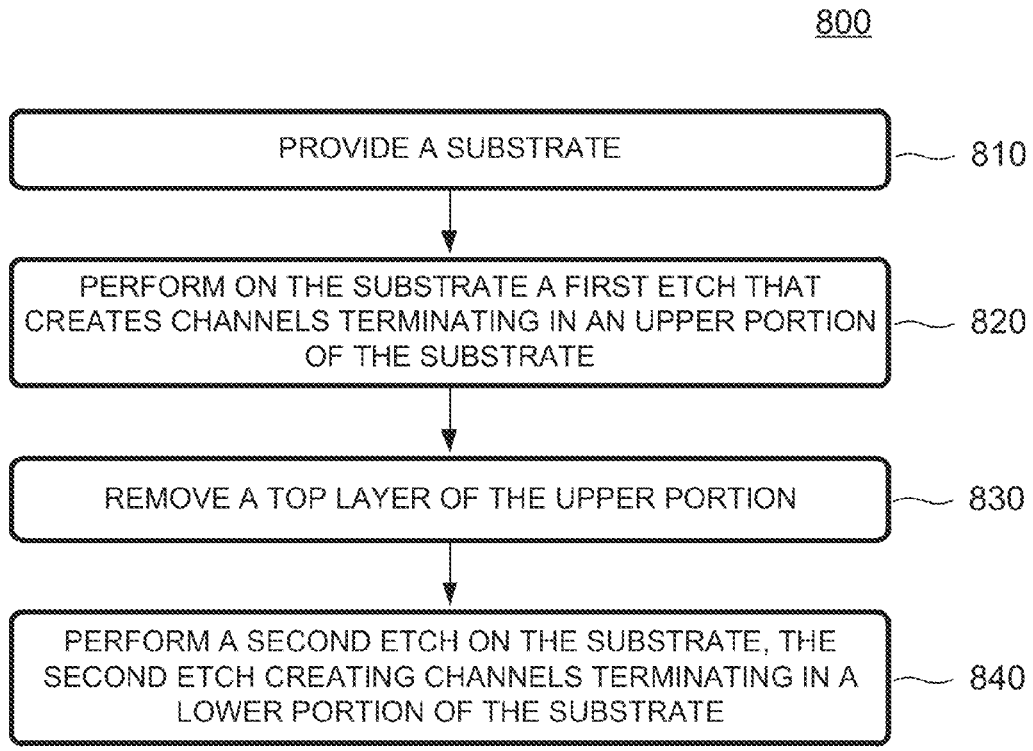
FIG. 8 is a flowchart illustrating a method of manufacturing a porous structure for an energy storage device according to another embodiment of the invention.

FIG. 8 is a flowchart illustrating a method 800 of manufacturing a porous structure for an energy storage device according to another embodiment of the invention. As discussed below, method 800 may facilitate the formation of a porous structure similar to any of the porous structures depicted in FIGS. 5a-5d and FIG. 6. A porous structure manufactured according to method 800 is depicted at various stages during its formation, as discussed below, in FIGS. 9a-9c.

Figure 9A:
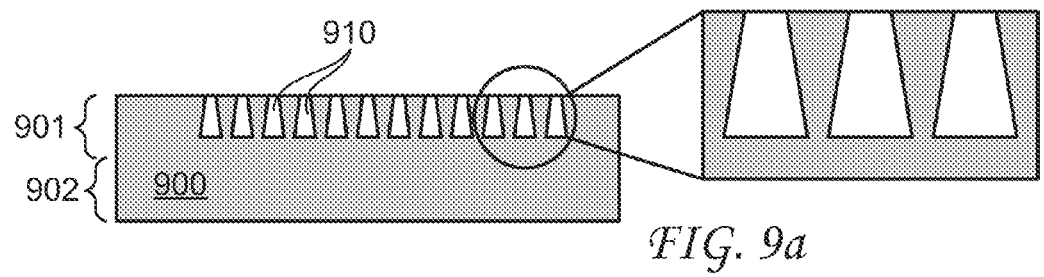
FIGS. 9a-9c are cross-sectional views of a porous structure—manufactured according to the method of FIG. 8—at various stages during its formation according to embodiments of the invention.

A step 810 of method 800 is to provide a substrate having an upper portion and a lower portion. It should be understood that the upper and lower portions may—and likely will—initially be physically indistinguishable from each other in terms of their composition, and are identified here only for convenience of discussion. in other words, the upper and lower portions, at least initially, are not physically distinguishable features of the substrate. As an example, the substrate can he similar to a substrate 900 having an upper portion 901 and a lower portion 902, as depicted in FIG. 9a. In the figure, upper portion 901 and lower portion 902 each account for roughly half of substrate 900, but it should he understood that such an even split between portions is not required, and the (imaginary) line dividing upper and lower portions may in other embodiments be located at some other depth within substrate 900. In some embodiments, for example, portion 901 may extend to a depth of about one micron while portion 902 extends from the bottom of portion 901 to a depth between about 10 microns and 300 microns. (The wafer itself in these embodiments may have a thickness between about 300 and 800 microns.)

A step 820 of method 800 is to perform on the substrate a first etch that creates relatively shallow channels terminating in the upper portion. As an example, these channels can be similar to channels 910, first shown in FIG. 9a. In one embodiment, channels 910 may extend approximately one micrometer (hereinafter "micron" or "μm") into substrate 900. The cone-shaped structures most clearly depicted in the inset portion of FIG. 9a, though similar in certain respects to the conical channel structures discussed elsewhere herein, are actually intended as an indication of unwanted structure at and near the top of the channels. Although the cone-like structures may not actually occur, there is a roughly 100-nm membrane-like layer at and near the substrate surface with a configuration different from that of the rest of the structure. This membrane constitutes a layer having smaller channel openings, and these smaller openings hinder subsequent channel formation as well as electrolyte penetration and mobility.

Figure 9B:
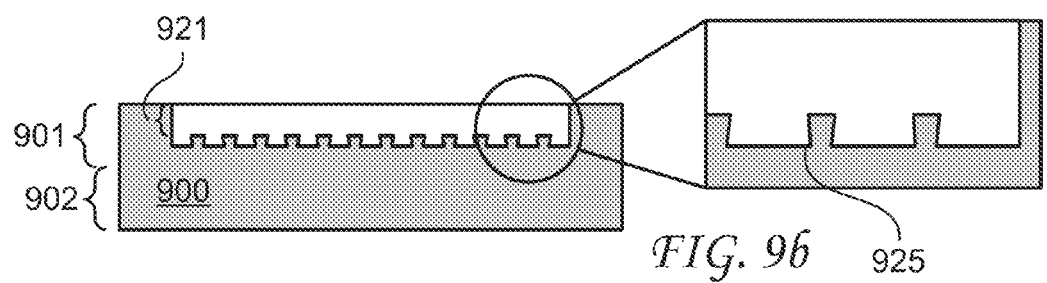

A step 830 of method 800 is to remove a top layer of the upper portion. FIG. 9b shows a possible result of the performance of step 830 on substrate 900. As shown in that figure, a sacrificial layer of silicon located within a top layer 921 of upper portion 901 has been removed using, for example, KOH or the like. In one embodiment, step 830 results in the removal of nearly all—perhaps 95 percent—of the portion of the substrate that was etched in step 820 (though in other embodiments a smaller percentage—25 percent is one example—may be removed). That process removes the upper membrane but leaves the lower (wider) ends of channels 910 in place, and these act as a template 925 for a subsequent etch (described below) that creates much deeper channels. With the upper membrane gone, access to the larger channel openings of the template is significantly enhanced, with the result that subsequent etching to create deeper (and perhaps tapered) channels—into which various desired coatings and substances may more easily be introduced—is greatly facilitated.

Figure 9C:
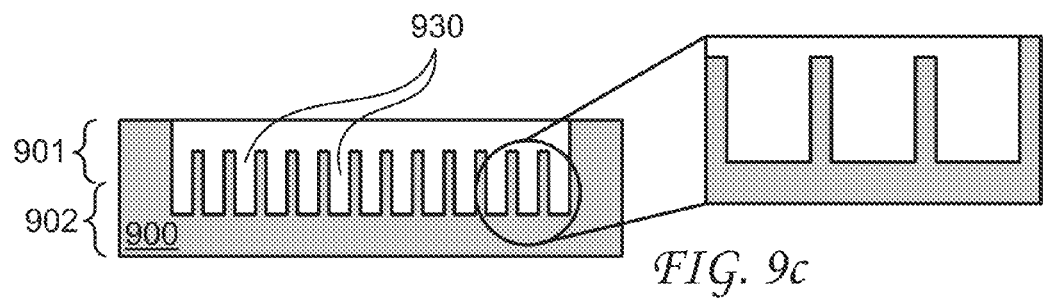

A step 840 of method 800 is to perform a second etch on the substrate, the second etch creating channels terminating in the lower portion. As an example, these channels can be similar to channels 930 that are shown in FIG. 9c. As mentioned above, template 925 acts as a guide for this second etch by providing openings that serve as relatively large upper ends of channels 930. Thus, lower ends of channels 910 become upper ends of channels 930. Although not apparent in the figure, at least some of the channels terminating in the lower portion may have a tapered or conical shape that can, for example, be similar to the channels shown in FIGS. 5a-5d and FIG. 6, and these can he created using any of the techniques disclosed herein. As one example, step 840 may be performed according to the techniques of method 700.

The larger channel openings produced by method 800 may be seen in FIGS. 10a and 10b, which are SEM images of the surface of a porous silicon substrate 1000 before (FIG. 10a) and after (FIG. 10b) the performance of method 800. Both images show channel openings in substrate 1000, but the openings in FIG. 10a are smaller and surrounded by more silicon while those in FIG. 10b are larger and more closely packed. The larger channel openings of FIG. 10b lead directly or indirectly, as discussed above, to increased capacitance and reduced ESR.

FIG. 11 is a flowchart illustrating a method 1100 of manufacturing a porous structure for an energy storage device according to another embodiment of the invention. As an example, method 1100 may result in the formation of a porous structure similar to any of the porous structures depicted in FIGS. 5a-5d and FIG. 6.

A step 1110 of method 1100 is to use an electrochemical process to etch channels into a substrate. As an example, the substrate can be similar to substrate 900 that is shown in FIGS. 9a-9c, and the channels can be similar to channels 910 that are shown in FIG. 9a.

Figure 12:
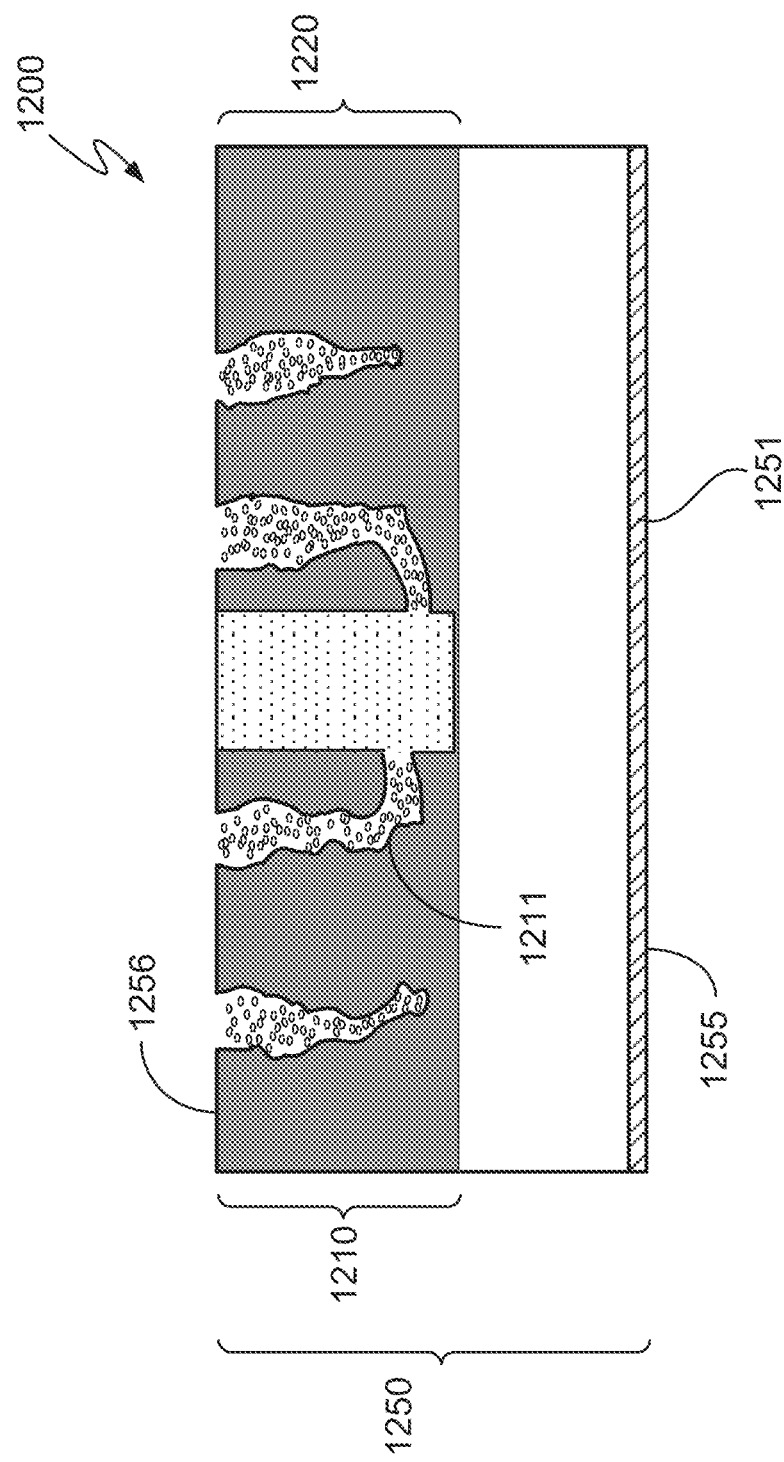
FIG. 12 is a cross-sectional view of a microelectronic assembly according to an embodiment of the invention.

A step 1120 of method 1100 is to taper a first end of the channels using backsputter etching. As an example, the performance of step 1120 may result in channels that are similar to channels 510 that are shown in FIGS. 5a-5d. As known in the art, the backsputter etching technique involves introducing argon gas into a vacuum system in Which the porous substrate has been placed. A plasma is struck, and the argon ions will preferentially etch away the corners of the channels thereby creating a widened channel opening, which is an alternate way to open up the top of the channels. Method 1100 might therefore be used as an alternative to method 800— especially for applications in which the added cost of a vacuum system is not an overriding deterrent, FIG. 12 is a cross-sectional view of a microelectronic assembly 1200 according to an embodiment of the invention. As illustrated in FIG. 12, microelectronic assembly 1200 comprises an integrated circuit (IC) die 1250 and an energy storage device 1220 associated with IC die 1250. In the illustrated embodiment, energy storage device 1220 is similar to energy storage device 101 as depicted in FIG. 1 or 2 but with tapered or conical channels as depicted in any of FIGS. 5a-5d and 6. However, other configurations of both the energy storage device and the channels are also possible, including any of the other devices and structures—including channel structures—disclosed herein.

Die 1250 has an active area 1251 containing transistors and other circuitry (not shown) that define a front side 1255 of die 1250. As an example, the active area circuitry could be used as a microprocessor or in an SoC (system-on-chip). Energy storage device 1220 includes a porous structure 1210 that, in certain embodiments, can be formed by etching die 1250 starting at a back side 1256. Although only four channels 1211 are shown, it should be understood that in reality many hundreds or thousands or channels would form part of the porous structure. If necessary, though the drawing does not reflect it, the electrolyte that these channels contain could be held in place by sealing the channels with a polyimide or other suitable material. In certain embodiments, energy storage device 1220 can be connected to active area 1251 using through silicon vias (TSVs) (not shown).

In certain embodiments, microelectronic assembly 1200 can be mounted on or otherwise attached to a substrate (not shown). This substrate—sometimes referred to as a "package substrate"—may comprise any suitable type of substrate capable of providing electrical communications between die 1250 and a next-level component to which microelectronic assembly 1200 is coupled (e.g., a circuit board). In another embodiment, the substrate may comprise any suitable type of substrate capable of providing electrical communication between die 1250 and an upper IC package coupled with microelectronic assembly 1200, and in a further embodiment the substrate may comprise any suitable type of substrate capable of providing electrical communication between the upper IC package and a next-level component to which microelectronic assembly 1200 is coupled. The substrate may also provide structural support for the die 1250.

By way of example, in one embodiment, the substrate comprises a multi-layer substrate—including alternating layers of a dielectric material and metal—built-up around a core layer (either a dielectric or metal core). In another embodiment, the substrate comprises a careless multi-layer substrate. Other types of substrates and substrate materials may also find use with the disclosed embodiments (e.g., ceramics, sapphire, glass, and the like). Further, according to one embodiment, the substrate may comprise alternating layers of dielectric material and metal that are built-up over the die itself, in a process sometimes referred to as a "bumpless build-up process." Where such an approach is utilized, traditional interconnect structures may not be needed (as the build-up layers may be disposed directly over die 1250).

IC die 1250 may comprise any type of integrated circuit device. In one embodiment, the die includes a processing system (either single core or multi-core). For example, the die may comprise a microprocessor, a graphics processor, a signal processor, a network processor, a chipset, etc. In one embodiment, IC die 1250 comprises a system-on-chip having multiple functional units (e.g., one or more processing units, one or more graphics units, one or more communications units, one or more signal processing units, one or more security units, and so forth). However, it should be understood that the disclosed embodiments are not limited to any particular type or class of IC devices.

Figure 13:
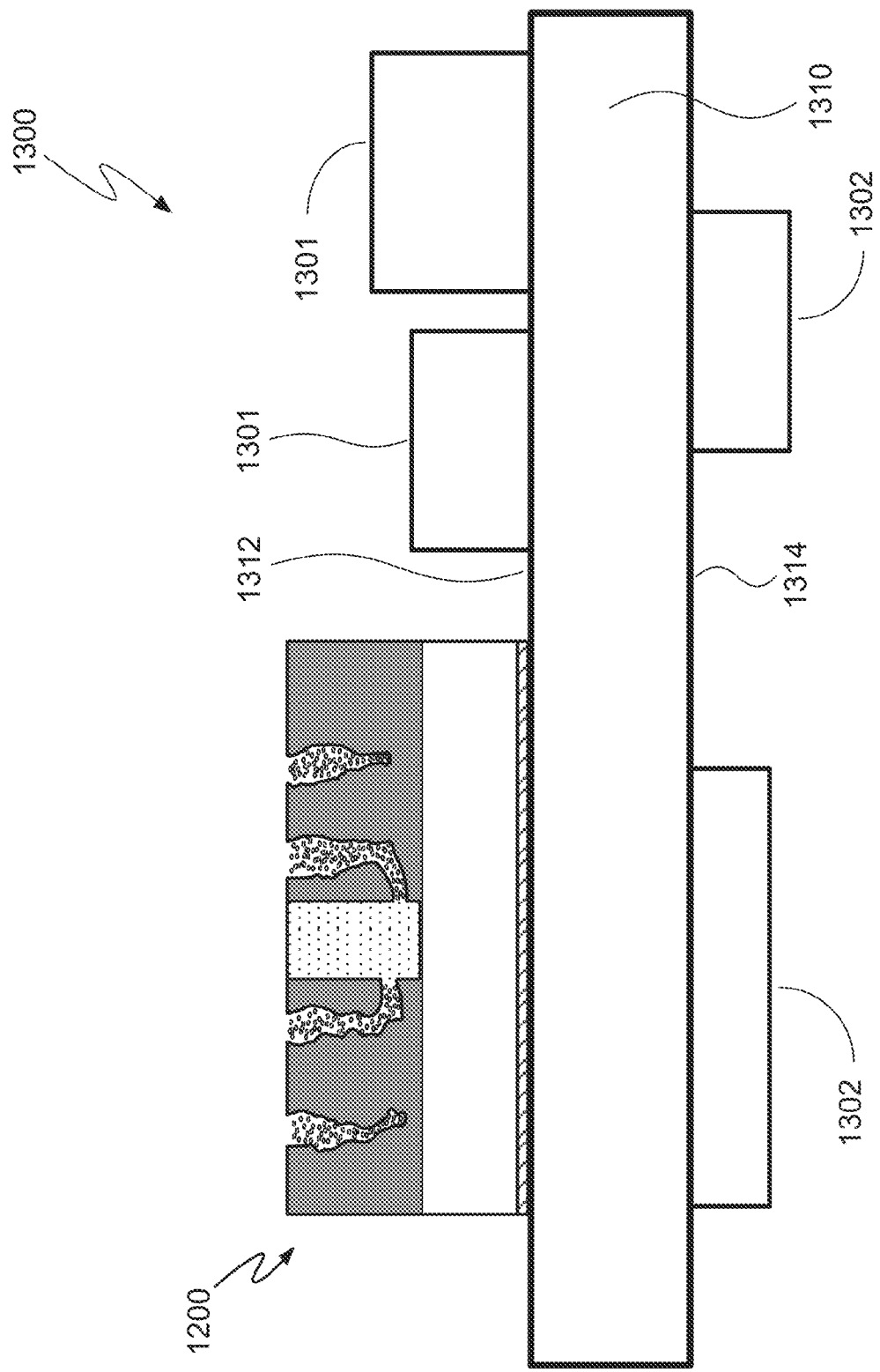
FIG. 13 is a representation of a computing system containing a porous structure according to an embodiment of the invention.

Turning now to FIG. 13, illustrated is an embodiment of a computing system 1300. System 1300 includes a number of components disposed on a board 1310 such as a motherboard, mainboard, or other circuit board. Board 1310 includes a side 1312 and an opposing side 1314, and various components may be disposed on either one or both of sides 1312 and 1314. In the illustrated embodiment, computing system 1300 includes a microelectronic assembly 1200 disposed on side 1312 of board 1310, and microelectronic assembly 1200 may comprise any of the embodiments described herein. Accordingly, microelectronic assembly 1200 may comprise a die (or other microprocessor) and an energy storage structure, as previously described. System 1300 may comprise any type of computing system, such as, for example, a handheld or mobile computing device (e.g., a cell phone, a smart phone, a mobile internet device, a music player, a tablet computer, a laptop computer, a nettop computer, etc.). However, the disclosed embodiments are not limited to hand-held and other mobile computing devices and these embodiments may find application in other types of computing systems, such as desk-top computers and servers.

Board 1310 may comprise any suitable type of circuit board or other substrate capable of providing electrical communication between one or more of the various components disposed on the board. In one embodiment, for example, board 1310 comprises a printed circuit board (PCB) comprising multiple metal layers separated from one another by a layer of dielectric material and interconnected by electrically conductive vias. Any one or more of the metal layers may be formed in a desired circuit pattern to route—perhaps in conjunction with other metal layers—electrical signals between the components coupled with board 1310. However, it should be understood that the disclosed embodiments are not limited to the above-described PCB and, further, that board 1310 may comprise any other suitable substrate.

In addition to energy storage structure 1350, one or more additional components may be disposed on either one or both sides 1312, 1314 of board 1310. By way of example, as shown in the figures, components 1301 may be disposed on side 1312 of board 1310, and components 1302 may be disposed on the board's opposing side 1314. Additional components that may be disposed on the board 1310 include other IC devices (e.g., processing devices, memory devices, signal processing devices, wireless communication devices, graphics controllers and/or drivers, audio processors and/or controllers, etc.), power delivery components (e.g., a voltage regulator and/or other power management devices, a power supply such as a battery, and/or passive devices such as a capacitor), and one or more user interface devices (e.g., an audio input device, an audio output device, a keypad or other data entry device such as a touch screen display, and/or a graphics display, etc.), as well as any combination of these and/or other devices. In one embodiment, computing system 1300 includes a radiation shield. In a further embodiment, computing system 1300 includes a cooling solution. In yet another embodiment, computing system 1300 includes an antenna. In yet a further embodiment, the system 1300 may be disposed within a housing or case. Where board 1310 is disposed within a housing, some of the components of computer system 1300—e.g., a user interface device, such as a display or keypad, and/or a power supply, such as a battery—may be electrically coupled with board 1310 (and/or a component disposed on this board) but may be mechanically coupled with the housing.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the energy storage device and the related structures and methods discussed herein may be implemented in a variety of embodiments, and that the foregoing discussion of certain of these embodiments does not necessarily represent a complete description of all possible embodiments.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An energy storage device comprising:
   at least one porous structure, wherein the porous structure contains multiple channels, each one of which has an opening to a surface of the porous structure, wherein:
   each one of the channels has a first end having a first average width and a second end having a second average width, with the first end being located where the channel opens to the surface of the porous structure and the second end being located at a distance from the first end as measured along a length of the channel; and
   for at least some of the channels, the first average width is larger than the second average width,
   at least some of the channels comprise one or more divots in a sidewall of the channel; and
   the divots have an average size that exceeds an average size of an ion in an electrolyte contained in the channel by no more than 0.5 nanometers.

2. The energy storage device of claim 1 wherein:
   at least some of the channels have a roughly conical shape.

3. The energy storage device of claim 1 wherein:
   at least some of the channels comprise:
   an upper section extending from the first end to an intermediate point between the first end and the second end; and
   a lower section extending from the intermediate point to the second end; and
   all of the upper section has the first average width.

4. The energy storage device of claim 1 wherein:
   the channels are formed within a first material; and
   the first material contains a dopant species.

5. The energy storage device of claim 4 wherein:
   the first material is silicon;
   the dopant species is p-type; and
   the doped silicon has a resistivity that is no greater than 5 mΩ-cm.

6. An energy storage device comprising:
   a substrate comprising one of silicon, monocrystalline silicon, polycrystalline silicon, silicon on insulator germanium, GaAs, InP, BN, tin, copper, aluminum, nickel, calcium, tungsten, molybdenum, manganese, silicon carbide, and an alloy of silicon and germanium;
   at least one porous structure formed in the substrate, wherein the porous structure contains multiple channels having an opening to a surface of the porous structure, wherein: each one of the channels has a first end having a first average width and a second end having a second average width, with the first end being located where the channel opens to the surface of the porous structure and the second end being located at a distance from the first end as measured along a length of the channel; and
   for at least some of the channels, the first average width is larger than the second average width,
   wherein, at least some of the channels comprise one or more divots in a sidewall of the channel; and the divots have an average size that exceeds an average size of an ion in an electrolyte contained in the channel by no more than 0.5 nanometers.

7. The energy storage device of claim 6 wherein:
   at least some of the channels have a roughly conical shape, with the first average width being no greater than 250 nanometers and the second average width being no less than 5 nanometers.

8. The energy storage device of claim 6 wherein:
at least some of the channels comprise:
an upper section extending from the first end to an intermediate point between the first end and the second end; and
a lower section extending from the intermediate point to the second end; and
all of the upper section has the first average width.

9. The energy storage device of claim 8 wherein:
all of the lower section has the second average width.

10. The energy storage device of claim 6 wherein:
the substrate contains a dopant species.

11. A method of manufacturing a porous structure for an energy storage device, the method comprising:
providing a substrate;
performing a first etch on the substrate, the first etch creating channels terminating in an upper portion of the substrate;
removing a top layer of the upper portion; and
performing a second etch on the substrate, the second etch creating channels terminating in a lower portion of the substrate, wherein:
performing the second etch further comprises creating divots in a sidewall of at least some of the channels, the divots having an average size that exceeds and average size of an ion in an electrolyte contained in the channel by no more than 0.5 nanometers.

12. The method of claim 11 wherein:
at least some of the channels terminating in the lower portion have a roughly conical shape.

13. The method of claim 11 wherein:
each one of the channels terminating in the lower portion has a first end having a first average width and a second end having a second average width, with the first end being located at a boundary between the upper portion and the lower portion and the second end being located at a distance from the first end as measured along a length of the channel; and
for at least some of the channels, the first average width is larger than the second average width.

14. The method of claim 11 wherein:
at least some of the channels terminating in the lower portion comprise:
an upper section extending from the first end to an intermediate point between the first end and the second end; and
a lower section extending from the intermediate point to the second end; and
all of the upper section has the first average width.

15. The method of claim 14 wherein:
all of the lower section has the second average width.

16. A microelectronic assembly comprising:
a die; and
an energy storage device associated with the die, wherein the energy storage device comprises:
at least one porous structure, wherein the porous structure contains multiple channels,
each one of which has an opening to a surface of the porous structure, wherein each one of the channels has a first end having a first average width and a second end having a second average width, with the first end being located where the channel opens to the surface of the porous structure and the second end being located at a distance from the first end as measured along a length of the channel, and for at least some of the channels, the first average width is larger than the second average width,
at least some of the channels comprise one or more divots in a sidewall of the channel; and
the divots have an average size that exceeds an average size of an ion in an electrolyte contained in the channel by no more than 0.5 nanomerers.

17. The energy storage device of claim 16 wherein:
at least some of the channels have a roughly conical shape, with the first average width being no greater than 250 nanometers and the second average width being no less than 5 nanometers.

18. The energy storage device of claim 16 wherein:
at least some of the channels comprise:
an upper section extending from the first end to an intermediate point between the first end and the second end; and
a lower section extending from the intermediate point to the second end; and
all of the upper section has the first average width.

19. The energy storage device of claim 18 wherein:
all of the lower section has the second average width.

20. The energy storage device of claim 16 wherein:
the porous structure contains a dopant species.

* * * * *